United States Patent [19]
Goto et al.

[11] Patent Number: 5,187,127
[45] Date of Patent: Feb. 16, 1993

[54] FIBER-REINFORCED SILICON NITRIDE CERAMIC

[75] Inventors: Yasuhiro Goto, Urayasu; Takeyuki Yonezawa, Tokyo; Yoshiyuki Ohnuma, Kawasaki; Jen Ando, Yokohama, all of Japan

[73] Assignee: Kabushiki Kaisha Toshiba, Kawasaki, Japan

[21] Appl. No.: 807,759

[22] Filed: Dec. 17, 1991

Related U.S. Application Data

[63] Continuation of Ser. No. 590,594, Sep. 27, 1990, abandoned, which is a continuation of Ser. No. 471,061, Jan. 29, 1990, abandoned, which is a continuation of Ser. No. 245,223, Sep. 16, 1988, abandoned.

[30] Foreign Application Priority Data

Sep. 18, 1987 [JP] Japan ................... 62-233938

[51] Int. Cl.$^5$ .................. C04B 35/58; C04B 35/80
[52] U.S. Cl. ........................ 501/95; 501/92; 501/97; 501/98
[58] Field of Search .............. 501/92, 95, 96, 97, 501/98

[56] References Cited

U.S. PATENT DOCUMENTS

| | | | |
|---|---|---|---|
| 4,507,224 | 3/1985 | Toibara et al. | 252/516 |
| 4,560,669 | 12/1985 | Matsuhiro et al. | 501/98 X |
| 4,609,633 | 9/1986 | Fukuhara et al. | 501/98 X |
| 4,652,276 | 3/1987 | Burden | 501/98 X |
| 4,746,636 | 5/1988 | Yokoyama | 501/98 X |
| 4,777,155 | 10/1988 | Baba et al. | 501/92 X |
| 4,801,564 | 1/1989 | Baba | 501/92 |
| 4,855,262 | 8/1989 | Richon et al. | 501/92 |

FOREIGN PATENT DOCUMENTS

| | | | |
|---|---|---|---|
| 0039768 | 3/1984 | Japan | 501/97 |
| 0054680 | 3/1984 | Japan | 501/92 |
| 9137366 | 8/1984 | Japan . | |
| 0077174 | 5/1985 | Japan | 501/97 |

OTHER PUBLICATIONS

Suresh et al., "Fracture of $Si_3N_4$-SiC Whisker Composites Under Cyclic Loads", J. Am. Cev. Soc. 71[3](1988) pp. 158-161.

*Primary Examiner*—Karl Group
*Attorney, Agent, or Firm*—Oblon, Spivak, McClelland, Maier & Neustadt

[57] ABSTRACT

According to the present invention, there is provided a fiber-reinforced silicon nitride ceramic prepared by sintering a starting composition containing silicon nitride, at least one sintering additive and silicon carbide fiber or a fiber containing silicon carbide as a major constituent (to be referred to as a silicon carbide fiber hereinafter), characterized in that said silicon carbide fiber has a length of 200 μm or more, and is contained 5 to 50 wt %, and said sintering additive is contained 0.1 to 30 wt % and is selected from the group consisting of an oxide, a nitride, and a carbide of titanium or zirconium, a composite oxide of titanium and zirconium, magnesia, and spinel. When the contents of the fibers and the sintering addtives fall within the ranges according to the present invention, a high strength and a large toughness value are simultaneously obtained.

4 Claims, 2 Drawing Sheets

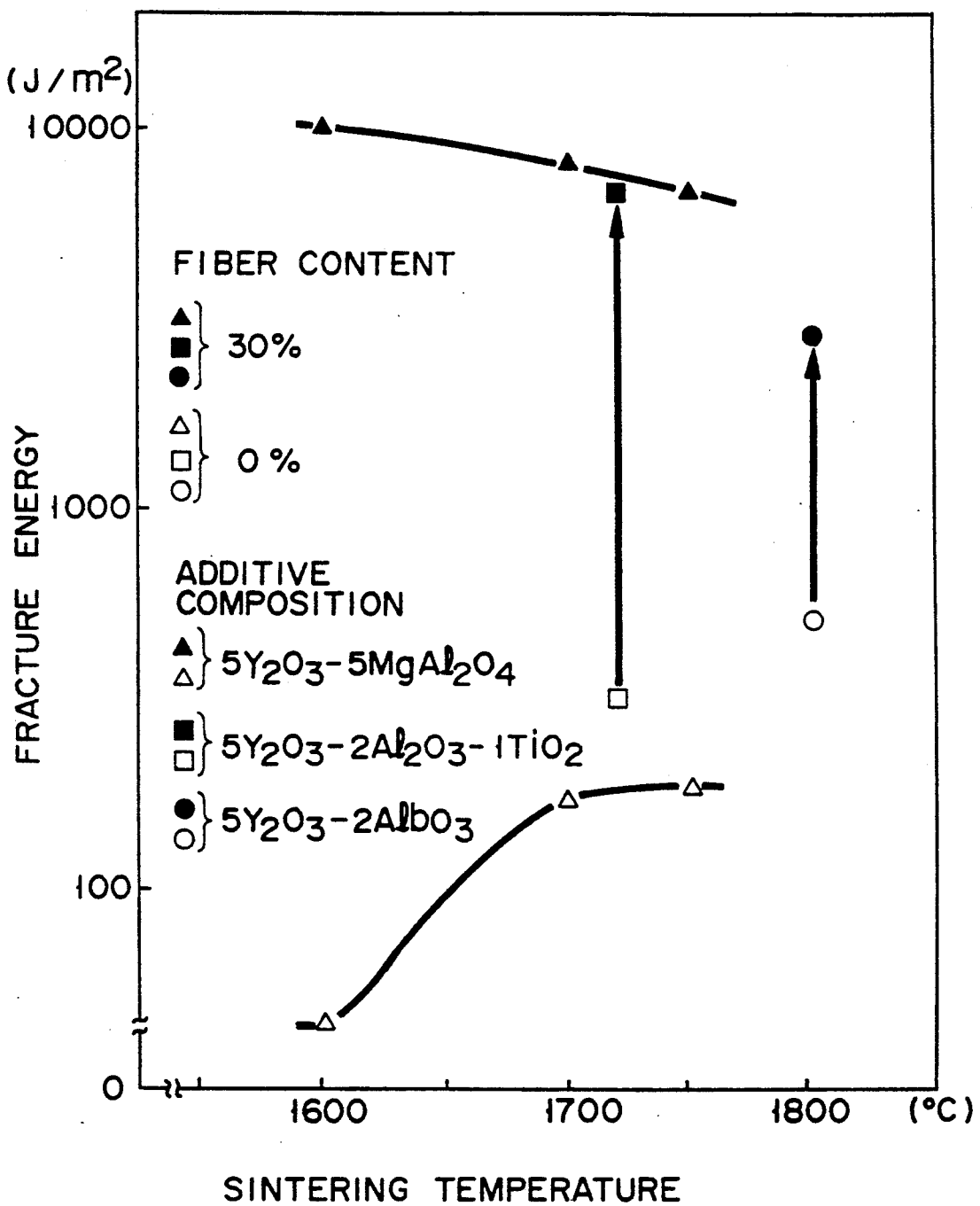
F I G. 1

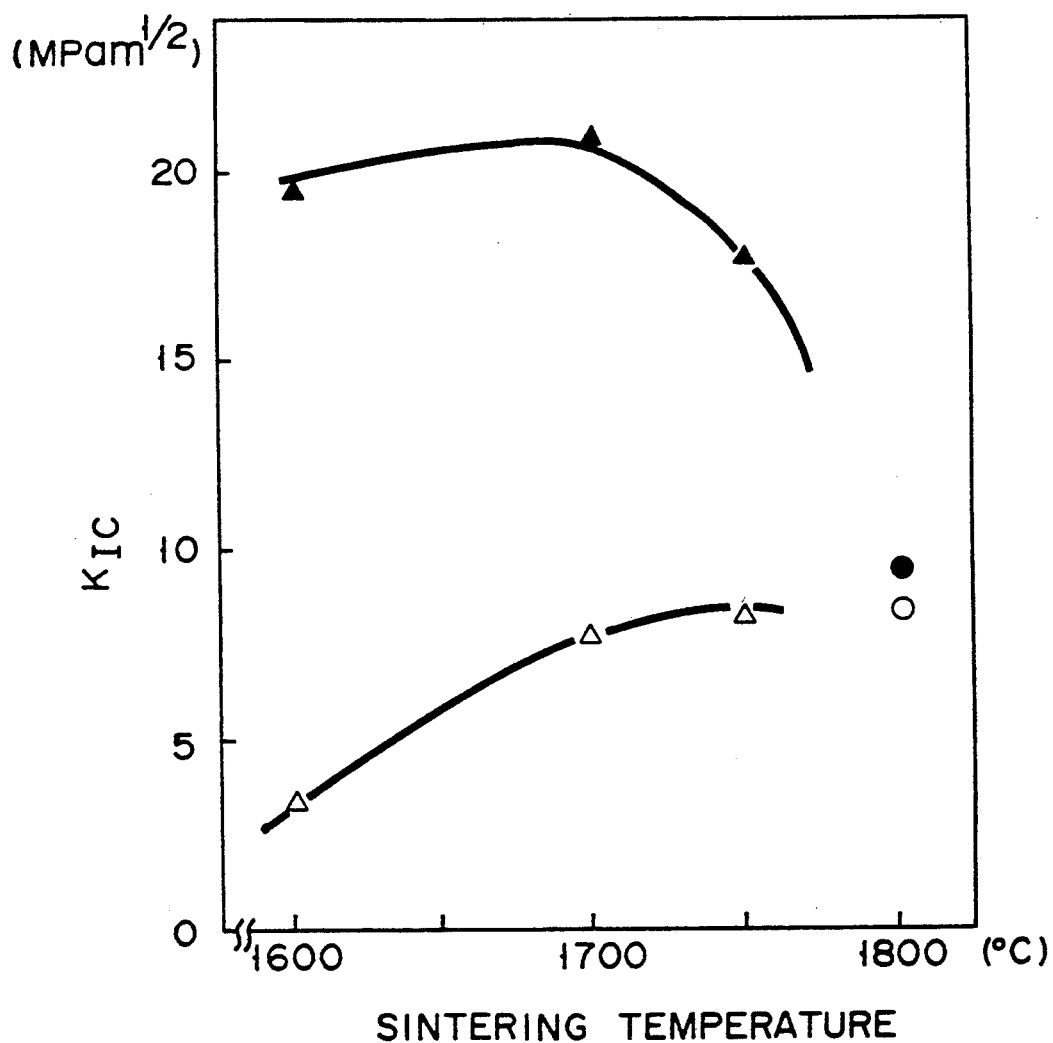
F I G. 2 ic as mechanical parts or structural materials,
FIBER-REINFORCED SILICON NITRIDE CERAMIC This application is a continuation of application Ser. No. 07/590,594, filed on Sep. 27, 1990, which is a continuation of Ser. No. 07/471,061, filed Jan. 29, 1990, which is a continuation of Ser. No. 07/245,223, filed Sep. 16, 1988, all are now abandoned.

BACKGROUND OF THE INVENTION

1. Field of the Invention

The present invention relates to a fiber-reinforced silicon nitride ceramic having a high fracture strength and excellent toughness.

2. Description of the Related Art

A silicon nitride ceramic has a fracture strength and thermal resistance higher than those of other ceramic materials. However, in order to use the silicon nitride ceramic as mechanical parts or structural materials, brittleness inherent to the ceramic must be overcome. This brittleness can be represented by a toughness value. Although the silicon nitride ceramic has a relatively high toughness value, its toughness must be further improved in practical applications.

Extensive studies have been made to improve toughness by a composite material obtained by incorporating fibers into a silicon nitride matrix, i.e., by a fiber-reinforced ceramic.

There are two types of fibers: a whisker which is a single crystal having a size substantially equal to a silicon nitride grain; and a long fiber having a length and size much larger than those of the silicon nitride grain. Since the long fiber has a crack arrest effect and a pull-out effect as compared with the whisker, the long fiber has been regarded to be effective for improving toughness. However, the long fiber is not a single crystal unlike the whisker and often contains polycrystalline and amorphous components. C-fibers may be mixed in the cores of the long fibers, depending on a manufacturing method. For these reasons, the long fiber has heat resistance lower than that of the whisker. During the sintering of silicon nitride containing long fibers, decreases in mechanical strength and modulus of elasticity inevitably occur. In addition, good bonding strength cannot be obtained between the silicon nitride matrix and the fibers. Therefore, expected improvement of toughness has not been made. In the past studies, it was found that this problem occurred since optimal sintering additive and sintering conditions for only the silicon nitride matrix were simply applied to a composite system of long fibers. It is therefore necessary to find a sintering additive suitable for a composite ceramic system of the long fiber and the ceramic material although such an additive may not be necessarily be optimal to the matrix.

SUMMARY OF THE INVENTION

It is an object of the present invention to provide a fiber-reinforced silicon nitride ceramic having a high mechanical strength and excellent toughness.

According to the present invention, there is provided a fiber-reinforced silicon nitride ceramic prepared by sintering a starting composition containing silicon nitride, at least one sintering additive and silicon carbide fiber or a fiber containing silicon carbide as a major constituent (to be referred to as a silicon carbide fiber hereinafter), characterized in that said silicon carbide fiber has a length of 200 μm or more, and is contained 5 to 50 wt %, and said sintering additive is contained 0.1 to 30 wt % and is selected from the group consisting of an oxide, a nitride, and a carbide of titanium or zirconium, a composite oxide of titanium and zirconium, magnesia, and spinel. Instead of the above sintering additive, a ceramic according to the present invention may contain 0.1 to 15 wt % of at least one material selected from the group consisting of a rare earth oxide, alumina, and aluminum nitride, and 0.1 to 15 wt % of at least one material selected from the group consisting of an oxide, a nitride, and a carbide of titanium or zirconium, a composite oxide of titanium and zirconium, magnesia, and spinel.

BRIEF DESCRIPTION OF THE DRAWINGS

FIG. 1 is a graph showing the relationship between fracture energy and the sintering temperature; and FIG. 2 is a graph showing the relationship between the toughness value and the sintering temperature.

DETAILED DESCRIPTION OF THE PREFERRED EMBODIMENTS

A crystalline phase of silicon carbide as a fibrous material may be an α- or β-phase, or a mixture thereof. The length of the fiber is 200 μm or more and, preferably, 500 μm or more. This silicon carbide fiber has a high elasticity, a high strength, and a high aspect ratio. Therefore, when crack growth occurs in the silicon nitride matrix, its path is complicated, or the fibers are pulled out from the cracked portions. Thus, high energy is required for fracture, whereby a toughness value ($K_{IC}$) is increased. When the length of the fiber is less than 200 μm, its aspect ratio is decreased, and the above effect cannot be obtained.

The content of the silicon carbide fiber is set to fall within the range of 5 to 50 wt % due to the following reasons. When the content is less than 5 wt %, the above effect cannot be obtained. However, when the content exceeds 50 wt %, it is difficult to obtain a high density of a sintered body. In any case, the rigidity and toughness of the fiber are degraded.

It is very important to use at least one material as a sintering additive (first sintering additive) selected from the group consisting of an oxide, a nitride, and a carbide of titanium or zirconium, a composite oxide of titanium and zirconium, magnesia, and spinel. The above sintering additive may be used together with at least one sintering additive (second sintering additive) selected from the group consisting of a conventionally known rare earth oxide represented by yttria, alumina, and aluminum nitride.

In the fiber-reinforced silicon nitride ceramic, in order to obtain the function of the mechanism for improving toughness by pulling-out of the fibers, bonding strength between the silicon nitride matrix and the silicon carbide fiber should not be too high. In addition, when a reaction occurs at the interface between the silicon nitride matrix and the silicon carbide fiber, a composite effect of the matrix and the fiber cannot be expected. When only the second sintering additive is used, the bonding strength at the interface between the matrix and the fiber is too high, and a conspicuous composite effect cannot be obtained. However, when the first sintering additive is used as the sintering additive, bonding strength between the matrix and the fiber can be optimized for fiber pull-out. The toughness value can be increased by the increase of the required fracture energy.

A conventional fiber-reinforced silicon nitride ceramic is sintered at a temperature of 1,750° C. or more. When the ceramic is sintered at such a high temperature, the strength and the modulus of elasticity of the fiber are degraded. In addition, the bonding strength at the interface between the matrix and the fiber is not suitable for fiber pull-out. However, when the first sintering additive is used as the sintering additive, a liquid phase occurs at a lower temperature by a reaction between the sintering additives or between the sintering additive and silicon nitride. Therefore, the sintering temperature can be reduced to a temperature of 1,700° C. or less. The degradation of the strength and the modulus of elasticity of the fiber does not occur, thereby optimizing the bonding strength between the matrix and the fiber.

According to the present invention, the content of the first sintering additive falls within the range of 0.1 to 30 wt % or 0.1 to 15 wt % due to the following reason. When the content is lower than the lower limit of the above range, the above effect cannot be obtained. However, the content is excessively large, the quantity of the grain boundary phase is increased to degrade the strength. When a yttria-alumina-magnesia agent is used as a sintering additive, a total content of yttria and alumina preferably falls within the range of 1 to 10 wt %, and the content of magnesia preferably falls within the range of 1 to 10 wt %. In this case, more preferably, the content of the silicon carbide fiber, the total content of yttria and alumina, and the content of magnesia fall within the ranges of 10 to 30 wt %, 5 to 10 wt %, and 3 to 7 wt %, respectively.

One of the reasons why the silicon nitride ceramic exhibits a high strength lies in an entangled fine structure obtained such that silicon nitride $\beta$-phase columnar grains are grown in the $\alpha$-$\beta$ transition during sintering. However, when the sintering temperature is decreased as mentioned above, the $\alpha$-$\beta$ transition of the silicon nitride is not completed, and $\alpha$-phase silicon nitride grains are left in the resultant sintered body, thus causing a decrease in strength. In order to prevent this, 1 to 15 wt % of $\beta$-phase silicon nitride are added in addition to $\alpha$-phase silicon nitride as a silicon nitride material. In this case, the $\beta$-phase silicon nitride serves as a nucleus for allowing growth of $\beta$-phase columnar grains during $\alpha$-$\beta$ transition. Therefore, the $\alpha$-$\beta$ transition occurs at a low temperature, thereby increasing the strength of the sintered body.

EXAMPLES

The present invention will be described in detail by way of its examples.

In Examples 1 to 23 and Control 1 to 10, the silicon nitride materials were $\alpha$-phase silicon nitride having an average grain size of 0.7 $\mu$m, and $\beta$-phase silicon nitride having an average grain size of 1.2 $\mu$m; the silicon carbide fiber material was a fiber having a length of 100 to 40,000 $\mu$m, and sintering additives were yttria having an average grain size of 1.0 $\mu$m, alumina having an average grain size of 0.5 $\mu$m, aluminum nitride having an average grain size of 1.0 $\mu$m, zirconia having an average grain size of 0.8 $\mu$m, magnesia having an average grain size of 0.5 $\mu$m, spinel (MgAl$_2$O$_4$; represented as "SP" in Table 1) having an average grain size of 0.5 $\mu$m, titania having an average grain size of 0.6 $\mu$m, and titanium nitride having an average grain size of 0.2 $\mu$m.

The materials were mixed for bodies to be sintered in accordance with compositions shown in Table 1. Each composition was mixed in a ball mill with rubber lining for about 24 hours. A solvent was n-butanol. The resultant mixtures were respectively cold-pressed (CP) and were sintered for an hour each at temperatures shown in Table 1 according to hot press (HP) or normal-temperature sintering (NS) under a nitrogen atmosphere. In this case, a predetermined number of silicon carbide fibers were aligned in one direction in the molding process to obtain the green bodies with some fiber layers.

The density, the fracture strength, the fracture energy, and the toughness value of each sintered body are summarized in Table 1. The density is a bulk density measured by an Archimedean method using water as a medium. The fracture strength was measured by a 3-point bending method for a sample having a width of 4 mm, a thickness of 3 mm, and a span was 30 mm. The toughness value ($K_{IC}$) was measured according to an SENB method. In this method, a 0.1-mm wide U-shaped notch was formed by a diamond cutter on a sample having the same size as that in the fracture strength measurement at a cross-head speed of 0.5 mm/min at room temperature. The fracture energy was calculated from an area of a load-deflection curve obtained in the toughness test and a cross-sectional area of the fractured sample.

As is apparent from Table 1, when the contents of the fibers and the sintering additives fall within the ranges according to the present invention, a high strength of 100 kg/mm$^2$ or more and a large toughness value of 17 MPam$^{1/2}$ or more were obtained. However, when the contents of the fibers and the sintering additives fall outside the ranges according to the present invention, a high strength and a larger toughness value cannot be simultaneously obtained.

The sintering additives (the numeric values affixed to the sintering additives represent wt %) shown in Table 1 were mixed in a mixture of a $\alpha$-phase silicon nitride powder having an average grain size of 0.7 $\mu$m and a $\beta$-phase silicon nitride powder having an average grain size of 1.2 $\mu$m to prepare mixtures. By using these mixtures, molded bodies containing and not containing 30 wt % of silicon nitride fibers having a length of 40 mm were prepared and sintered following the same procedures as in the aforementioned Examples.

Following the same calculations as in the above Examples, the fracture energy (FIG. 1) and the toughness values (FIG. 2; the sample symbols are the same as those in FIG. 1) of the resultant samples within the sintering temperature range of 1,600° to 1,800° C. were measured. The samples ( ▲ and ■ ) using the sintering additives according to the present invention have larger toughness values when they contain the fibers as compared with other samples (Δ, □, ○, and ●). In addition, sufficiently high toughness values can be obtained at low sintering temperatures with these samples ( ▲ and ■ ).

TABLE 1

| | Material Composition (wt %) | | | | | | | | |
|---|---|---|---|---|---|---|---|---|---|
| | Si$_3$N$_4$ | Y$_2$O$_3$ | Al$_2$O$_3$ | AlN | ZrO$_2$ | MgO | SP | TiO$_2$ | TiN | SiC fiber |

Example

TABLE 1-continued

| No. | | | | | | | | | |
|---|---|---|---|---|---|---|---|---|---|
| 1 | 55 | | | | 15 | | 10 | | 30 | 25 |
| 2 | 65 | | | | | 10 | | | | 25 |
| 3 | 79.9 | | | | | | 0.1 | | | 20 |
| 4 | 75 | | | | | | 5 | | | 20 |
| 5 | 65 | | | | | | 15 | | | 20 |
| 6 | 50 | | | | | | 30 | | | 20 |
| 7 | 50 | | | | | | | 20 | | 30 |
| 8 | 50 | | | | | | | | 30 | 20 |
| 9 | 60 | 5 | | | 5 | | 5 | | | 20 |
| 10 | 55 | 5 | 5 | | | | 5 | | | 30 |
| 11 | 54.9 | 0.1 | | | | | 15 | | | 30 |
| 12 | 45 | 15 | | | | | | 10 | | 30 |
| 13 | 60 | 5 | 5 | 5 | | | 5 | | | 20 |
| 14 | 50 | | 10 | | | | 10 | | | 30 |
| 15 | 55 | | | 10 | | | | | 15 | 20 |
| 16 | 85 | 5 | | | | | 5 | | | 5 |
| 17 | 75 | 5 | | | | | 5 | | | 15 |
| 18 | 60 | 5 | | | | | 5 | | | 30 |
| 19 | 40 | 5 | | | | | 5 | | | 50 |
| 20 | 60 | 5 | | | | | 5 | | | 30 |
| 21 | 60 | 5 | | | | | 5 | | | 30 |
| 22 | 60 | 5 | | | | | 5 | | | 30 |
| 23 | 60 | 5 | | | | | 5 | | | 30 |

Control

| No. | | | | | | | | | |
|---|---|---|---|---|---|---|---|---|---|
| 1 | 65 | 5 | | | | | | | | 30 |
| 2 | 65 | 5 | 2 | 3 | | | | | | 25 |
| 3 | 60 | 5 | | | | | 5 | | | 30 |
| 4 | 30 | 5 | | | | | 5 | | | 60 |
| 5 | 30 | | | | | | 40 | | | 30 |
| 6 | 50 | 20 | | | | | | | 5 | 25 |
| 7 | 40 | 5 | | | | 25 | | | | 30 |
| 8 | 45 | 25 | | | | | 5 | | | 25 |
| 9 | 65 | 5 | | | | | | | | 30 |
| 10 | 65 | 5 | 2 | 3 | | | | | | 25 |

| | Fiber Length (μm) | Sintering Method | Sintering Temperature (°C.) | Density (g/cm$^3$) | Fracture Strength (kg/mm$^2$) | Toughness Value (MPam$^{\frac{1}{2}}$) | Fracture Energy (J/m$^2$) |
|---|---|---|---|---|---|---|---|
| Example | | | | | | | |
| 1 | 40000 | NS | 1650 | 3.18 | 121 | 18.2 | 9020 |
| 2 | 40000 | HP | 1650 | 3.22 | 118 | 19.3 | 10300 |
| 3 | 40000 | HP | 1680 | 3.21 | 106 | 17.4 | 9800 |
| 4 | 40000 | HP | 1650 | 3.23 | 113 | 18.5 | 9910 |
| 5 | 40000 | HP | 1600 | 3.23 | 123 | 20.2 | 10500 |
| 6 | 40000 | HP | 1550 | 3.22 | 116 | 19.6 | 10000 |
| 7 | 40000 | HP | 1650 | 3.20 | 108 | 17.6 | 9250 |
| 8 | 40000 | HP | 1680 | 3.20 | 111 | 18.0 | 9560 |
| 9 | 40000 | HP | 1650 | 3.21 | 120 | 20.1 | 9980 |
| 10 | 40000 | NS | 1660 | 3.18 | 125 | 21.6 | 10200 |
| 11 | 40000 | HP | 1600 | 3.21 | 109 | 17.8 | 9250 |
| 12 | 40000 | HP | 1620 | 3.22 | 128 | 22.1 | 11300 |
| 13 | 40000 | NS | 1690 | 3.20 | 110 | 18.6 | 9420 |
| 14 | 40000 | NS | 1600 | 3.19 | 105 | 18.3 | 9300 |
| 15 | 40000 | NS | 1670 | 3.19 | 102 | 17.6 | 8950 |
| 16 | 40000 | HP | 1600 | 3.22 | 105 | 17.9 | 8800 |
| 17 | 40000 | HP | 1600 | 3.21 | 118 | 19.0 | 9600 |
| 18 | 40000 | HP | 1600 | 3.20 | 123 | 19.8 | 10100 |
| 19 | 40000 | HP | 1600 | 3.19 | 110 | 18.1 | 9670 |
| 20 | 4000 | HP | 1600 | 3.20 | 115 | 18.2 | 9280 |
| 21 | 1000 | HP | 1600 | 3.20 | 106 | 17.3 | 8830 |
| 22 | 500 | HP | 1600 | 3.20 | 103 | 17.2 | 8620 |
| 23 | 200 | HP | 1600 | 3.20 | 100 | 17.1 | 9010 |
| Control | | | | | | | |
| 1 | 40000 | HP | 1800 | 3.22 | 60 | 10.3 | 5420 |
| 2 | 40000 | HP | 1820 | 3.23 | 65 | 10.2 | 5200 |
| 3 | 100 | HP | 1800 | 3.20 | 78 | 7.9 | 2400 |
| 4 | 40000 | HP | 1800 | 2.91 | 55 | 5.2 | 1800 |
| 5 | 40000 | NS | 1600 | 3.24 | 72 | 9.6 | 4800 |
| 6 | 40000 | NS | 1800 | 3.22 | 48 | 5.5 | 1100 |
| 7 | 40000 | NS | 1650 | 3.21 | 66 | 5.9 | 1350 |
| 8 | 40000 | HP | 1650 | 3.22 | 79 | 6.1 | 1310 |
| 9 | 40000 | HP | 1650 | 2.98 | 50 | 5.4 | 990 |
| 10 | 40000 | HP | 1600 | 2.85 | 45 | 4.9 | 870 |

What is claimed is:

1. A fiber-reinforced silicon nitride ceramic produced by sintering a composition consisting essentially of:
   about 5 to about 50 wt % of a silicon carbide fiber having a length of 200 μm or more;
   about 50 wt % or more of silicon nitride;
   about 0.1 to about 15 wt % of at least one sintering additive selected from the group consisting of an oxide, a nitride or a carbide of titanium or zirconium, a composite oxide of titanium and zirconium, magnesia, and spinel; and about 0.1 to about 15 wt % of a at least one second sintering additive comprising at least one selected from the group consisting of a rare earth oxide, alumina, and aluminum nitride;

wherein said silicon nitride ceramic exhibits a fracture strength of at least 100 Kg/mm$^2$, and a toughness value of at least 17.1 MPa M$^{1/2}$.

2. A fiber-reinforced silicon nitride ceramic according to claim 1, wherein said rare earth oxide comprises yttria.

3. A fiber-reinforced silicon nitride ceramic according to claim 2, wherein said composition consists essentially of 10 to 30 wt % of said fiber, and said sintering additive consists essentially of 5 to 10 wt % of yttria and 3 to 7 wt % of magnesia.

4. A fiber-reinforced silicon nitride ceramic according to claim 2, wherein said sintering additive consists essentially of yttria, alumina and magnesia.

* * * * *

UNITED STATES PATENT AND TRADEMARK OFFICE
CERTIFICATE OF CORRECTION

PATENT NO. : 5,187,127
DATED : February 16, 1993
INVENTOR(S) : Yasuhiro Goto et al.

It is certified that error appears in the above-identified patent and that said Letters Patent is hereby corrected as shown below:

On the title page, Item [75],

The fourth inventor's name is spelled incorrectly, should read as follows: --Ken Ando--

Signed and Sealed this

Twenty-third Day of November, 1993

Attest:

BRUCE LEHMAN

Attesting Officer

Commissioner of Patents and Trademarks